Jan. 3, 1967   E. JAULMES   3,295,863
DEMOUNTABLE CYCLE
Filed Oct. 19, 1964   4 Sheets-Sheet 1
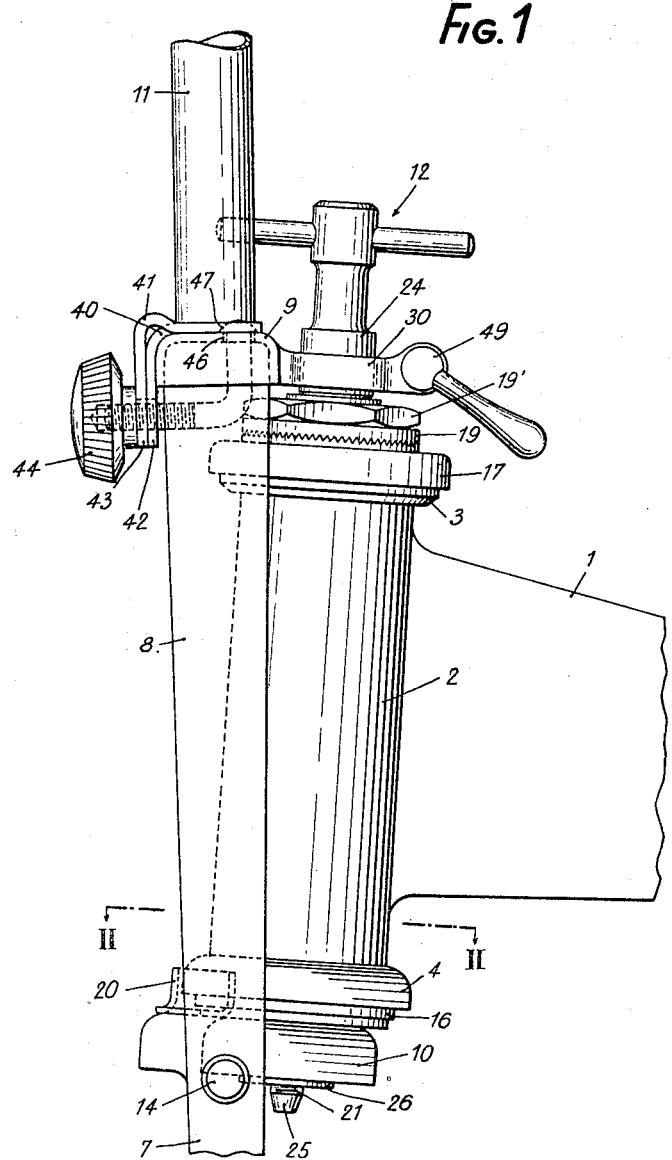
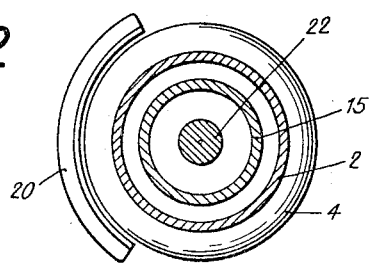
INVENTOR
ERIC JAULMES
BY
ATTORNEY

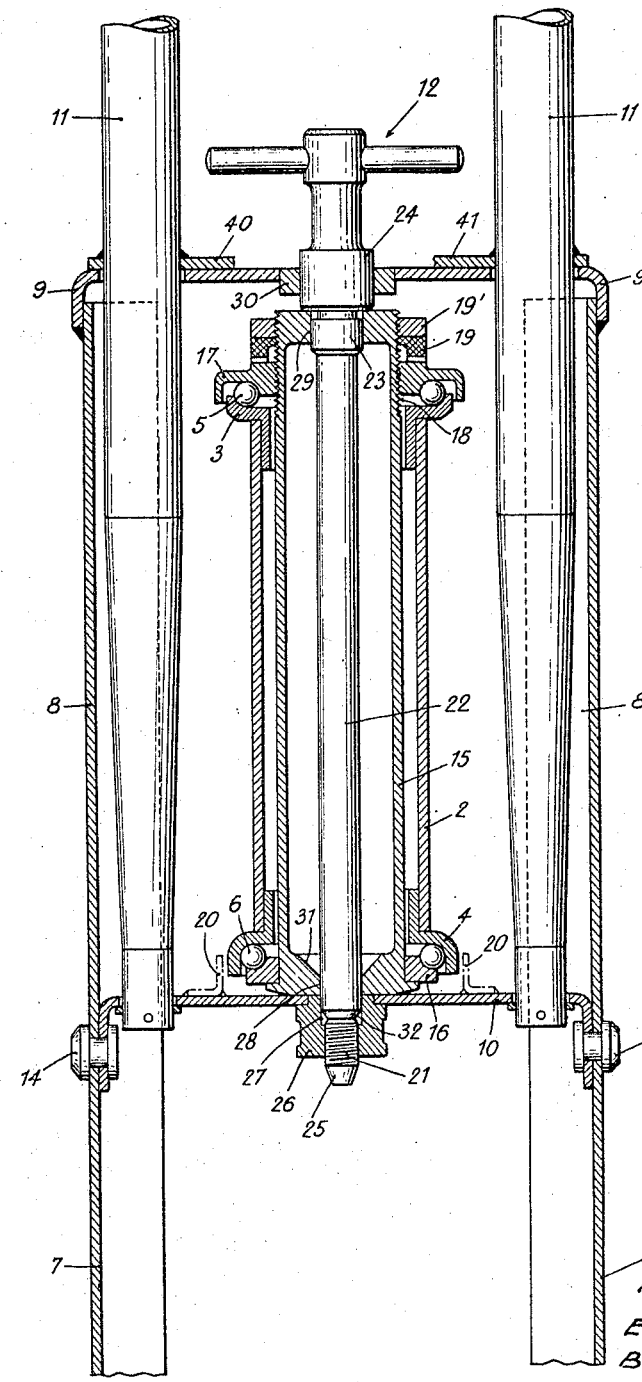

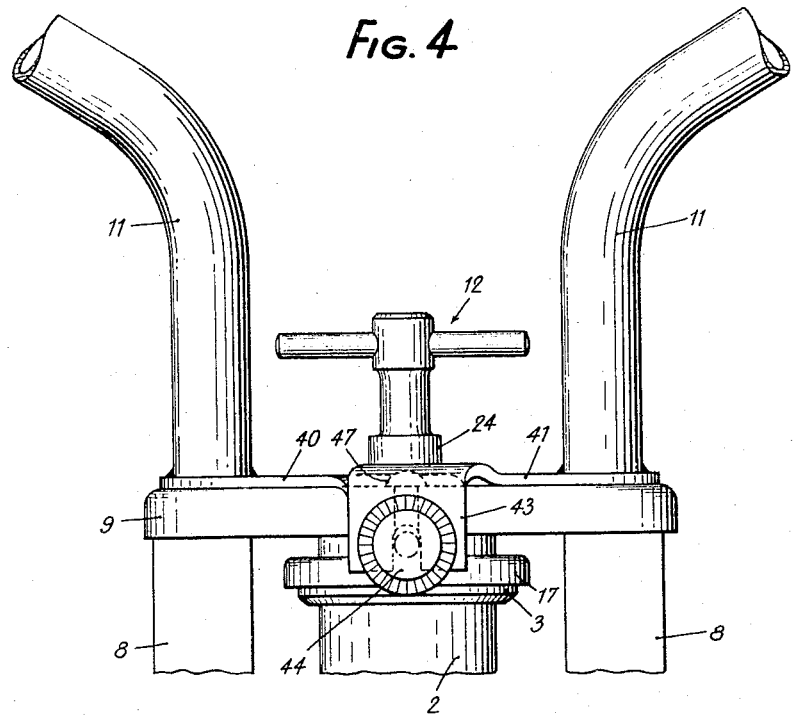
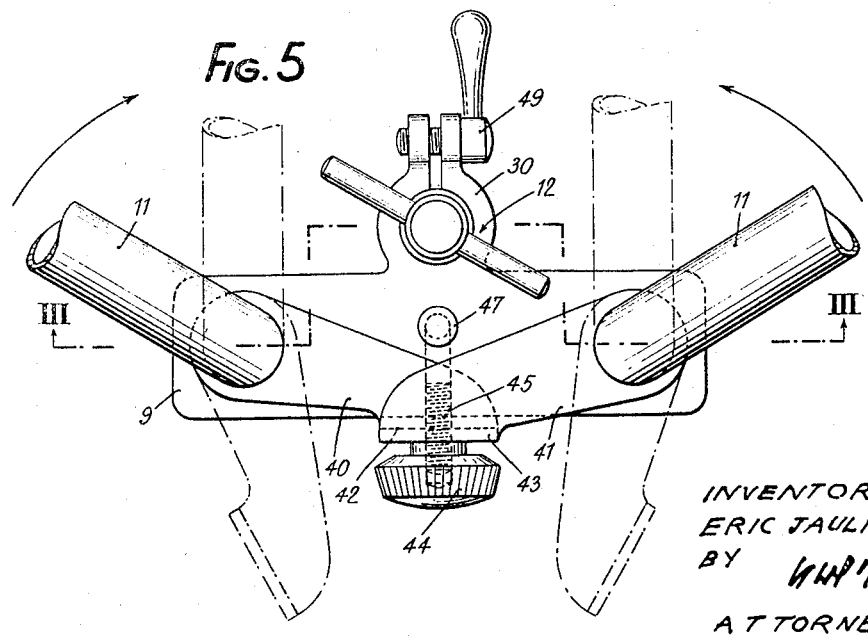

Jan. 3, 1967 E. JAULMES 3,295,863
DEMOUNTABLE CYCLE
Filed Oct. 19, 1964 4 Sheets-Sheet 4

INVENTOR
ERIC JAULMES
BY
ATTORNEY

United States Patent Office 3,295,863
Patented Jan. 3, 1967

3,295,863
DEMOUNTABLE CYCLE
Eric Jaulmes, Paris, France, assignor to Ateliers de la Motobecane, a corporation of France
Filed Oct. 19, 1964, Ser. No. 404,646
Claims priority, application France, Oct. 17, 1963, 950,848
10 Claims. (Cl. 280—278)

This invention relates to demountable cycles, more particularly to an autocycle with one front and one rear wheel connected by a frame which can be readily separated into two essential parts.

In his copending application Serial No. 344,138, filed February 11, 1964, entitled Collapsible Bicycle, now Patent No. 3,260,535, applicant has already described a separable cycle in which separable connecting means are provided between the frame on one hand and the front fork on the other hand. These two parts, each of which includes one wheel, may thus be stowed separately in the compartment of a motor car, for example, or superimposed to provide a package which is compact and not bulky. The solution which inventor has proposed for this purpose is especially applicable to ordinary cycles, which include a front fork, the head of which is made extendable by means of a pivot tube.

The present invention essentially relates to the creation of means by which this separation between the front part and the rear part may be attained in those cycles or autocycles of which the front fork, which is reinforced as compared with that of ordinary cycles, includes two uprights which extend the arms of the fork upwards, and which are interconnected by means of two horizontal transverse plates or cheeks, between which is placed the steering head carried by the frame.

The invention is based on the appreciation that a simple sliding rod, inserted axially through the vertical stack of components which make up the steering mechanism, suffices for effecting the connection.

The invention can be applied with particular advantage to autocycles with an engine driving the tire of the front wheel by a friction roller by reason of the fact that, the fuel tank being then incorporated in the engine, and all the controls being carried by the handlebars, the separation between the two constituent parts of the autocycle does not require any disconnection save possibly that of the rear brake and of the rear red lamp. Furthermore one can, in order to get rid of these disconnections on separation and reconnection on reassembly, provide on the one hand a brake operable by back-pedalling and on the other hand a rear lamp with a dry cell battery or a storage battery.

The invention is equally applicable, with advantage, to autocycles with an engine carried by the frame, and with a resilient front fork with telescopic arms, constructed in the manner referred to above. In such a fork, the steering pillar does not sustain any bending forces, the two plates or cheeks transmitting simly a shearing force to the two extremities of the latter.

In order to reduce the bulk of the front part of the autocycle once it has been separated, and according to a further feature of the invention, the two arms of the handlebars each pivot around a distinct vertical axis, so as to be able to move from their normal position to one in which they are directed rearwards and parallel to one another, and there is means for locking them in the running position.

When the invention is applied to autocycles with a front engine, it will be seen that the group formed by the handlebars, the fork, the front wheel and this engine itself constitutes a very compact whole, the handling and possible shifting of which are very easy, despite its relatively great weight. In fact, one can very easily wheel it in the manner of a wheelbarrow, which assists the operations of reassembly, in the course of which the steering head which belongs to the frame has to be inserted between the two cheeks and the assembly brought into alignment, to permit the introduction of the connecting rod.

To prevent the spilling of fuel, when the front part of the autocycle which carries the engine and the tank is, for example, laid down on the ground, a special valve will close the air inlet vent of this tank when the autocycle is dismantled.

Also, according to the invention, an abutment is fixed to the lower cheek, to prevent the fork, during the operation of reassembly, from passing beyond its position of alignment with the steering pillar, thus facilitating the introduction of the connecting rod.

Other characteristics and advantages of the invention will appear further from the description which will now be given of one example, which is simply an illustration, shown in the accompanying drawings, in which:

FIG. 1 is a partial view showing from the side, the device constructed according to the invention;

FIG. 2 is a partial section along the line II—II in FIG. 1;

FIG. 3 is a vertical axial section of the whole of the device, along the line III—III in FIGURE 5;

FIG. 4 is a partial view showing from the front, the device for folding the arms of the handlebar;

FIG. 5 is a plan view of the of subject of FIG. 4, and

Figure 6:
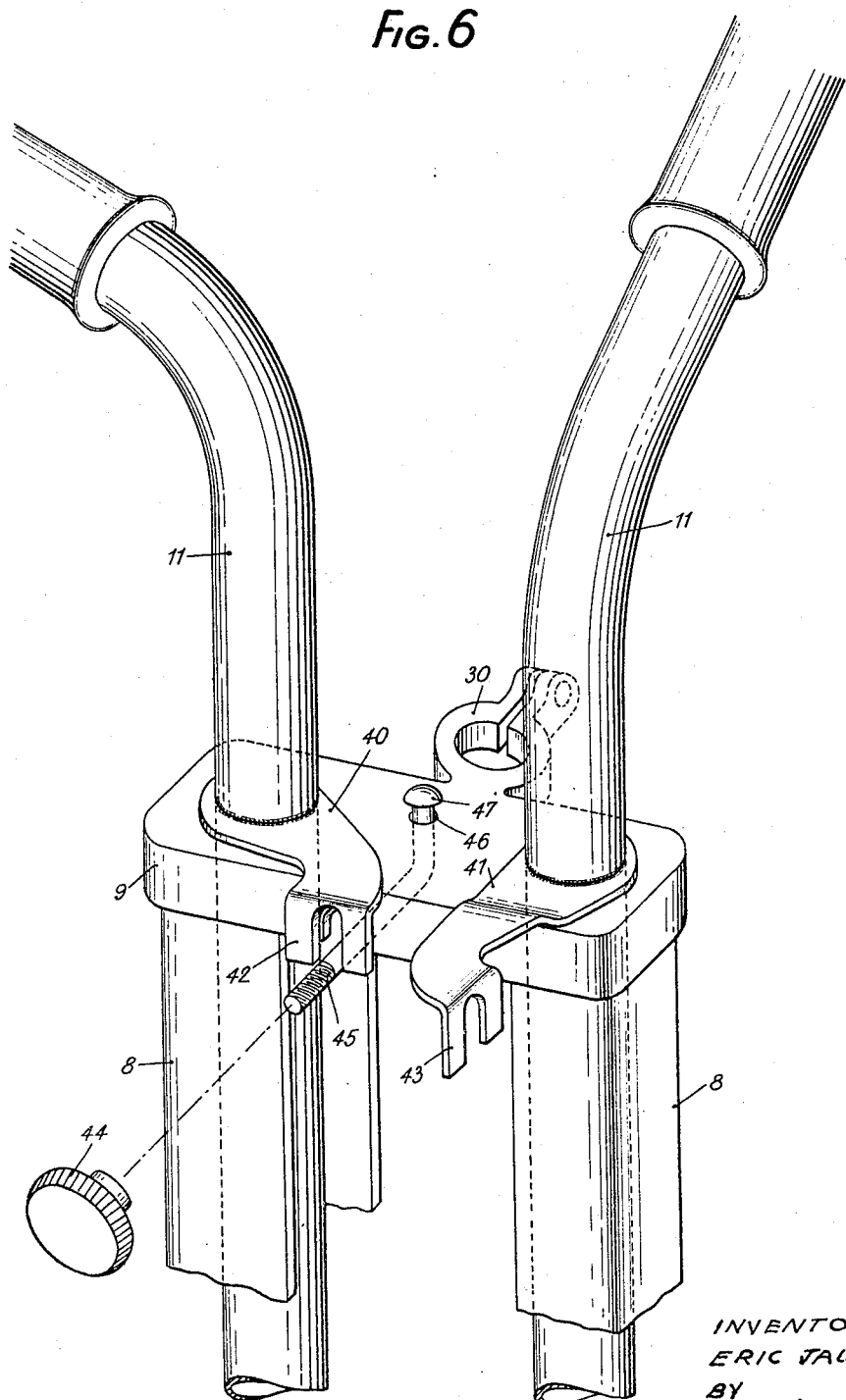
FIG. 6 shows in perspective the same device.

The frame 1 of the autocycle carries, at its front end, the steering head 2, to the extremities of which are fixed, for example by pressing, an upper cup 3 and a lower cup 4 for the usual sets of bearing balls 5 and 6. The arms 7 of the front fork are extended upwards by uprights 8, connected to one another by two horizontal cross members or cheeks, the upper cheek being identified as 9 and the lower cheek as 10. These two cheeks comprise pieces of pressed sheet metal, each pierced with three holes, namely two lateral holes through which pass vertical parts of the arms 11 of the handlebars, and a central hole corresponding to a connecting rod provided according to the invention and identified in its entirety as 12. In the example shown, the upper cheek 9 is welded to the uprights 8, and the lower cheek 10 is joined to these uprights by rivets 14.

The front fork being intended to be separated from the frame, special means are provided, according to the invention, for preventing falling out of the balls 5 and 6 on separation. For this purpose, a tubular pivoting sleeve 15 is inserted in the steering head 2, this sleeve carrying at its lower end a cone 16, and at its upper end a cone 17, cooperating respectively with the set of balls 6 and 5. In order to permit, on the one hand the mounting of the sleeve 15 in the interior of the steering head 2, and on the other hand the adjusting of the bearings, the cone 17 is screwed on a thread at the end of 18 of this sleeve, and locked in the adjusted position by a notched washer 19 and a lock nut 19'. All the steering mechanism described above constitutes a sub-assembly mounted permanently in the steering head 2, adjustment of which is in no way affected by the separation of the front fork.

According to the invention, this separation is permitted by the connecting rod 12, the details of which will be described below, with reference more particularly to FIG. 3.

In the first place, the rod 12 includes, from the bottom to the top, four successive portions of increasing diameter, the first being constituted by a threaded extremity 21, the second by a shank 22, the third by a cylindrical shoulder 23 and the fourth by a cylindrical shoulder 24.

It terminates towards the bottom in a lead-in cone 25. The threaded extremity 21 screws into a nut 26 welded to the lower face of the cheek 10. The shank 22 engages at the same time against a smooth bore 27 in the nut, and against a lower smooth bore 28 in the sleeve 15. The shoulder 23 engages against a smooth bore 29 in the upper end of the sleeve 15, and the shoulder 24 engages against a smooth bore of a split collar 30 fixed to the upper cheek 9.

In addition, the longitudinal spacing of these four portions 21, 22, 23, 24, and the height of each of them, is such that on inserting the connecting rod 12 into the sleeve 15, these four portions will come successively into position in the bores with which they correspond, in the order 21, 22, 23, and 24.

Finally, the diameter of the threaded extremity 21 is slightly less than that of the shank 22, and, on the other hand, a certain play is maintained between this shank 22 and the smooth bore 28 in which it engages, for purposes which will be specified later. This smooth bore 28 terminates upwards in an enlarged conical portion 31, and the shank 22 itself has, at its lower end, a conical chamfer 32, and so have the upper supporting surfaces 23 and 24.

On the upper face of the lower cheek 10, there is a forward abutment 20 in the arc of a circle, which is adapted to stop the displacement of the front fork towards the steering head during assembly of the autocycle, by abutting against the lower cup 4, thus effecting a rough precentering of the parts which are to be connected with the help of the rod 12.

It has been explained above, that, according to a feature of the invention, the two arms of the handlebar would be pivotal, so as to be able to be brought to a position in which they are parallel to one another, thus reducing the bulk of the part of the autocycle constituted by the front fork, the front wheel, the handlebars and possibly the engine. These arms should naturally be locked in running position, and the device constructed for this purpose, according to the invention, is more particularly shown in FIGURES 4, 5 and 6, to which reference will now be made.

As has been already described, each arm 11 pivots in the corresponding holes provided in the cheeks 9 and 10. On each arm 11 is fixed a bracket 40, 41, above the upper face of the cheek 9. The arms 11 are located axially by pins and washer against the lower face of the cheek 10. The two brackets 40, 41 each terminate in a fork 42, 43 directed vertically, and these two forks overlap on the center line of the cheek 9, as clearly shown in FIG. 5. The two brackets 40, 41, and in consequence the two arms 11 of the handlebars, are locked in running position by a knob 44 which screws onto a swinging rod 45 bent at right angles and engaged in a hole 46 in the cheek 9, where it is retained by its head 47.

The device constructed according to the invention is completed by the split collar 30 carried by the upper cheek 9, in which the connecting rod can be locked, by tightening a wing bolt 49.

Assuming that the autocycle is in the assembled condition, its separation is carried out in the following way. The split collar 30 is first released, by operating the wing bolt 49, to unlock the connecting rod 12. The latter may then be turned by hand to unscrew its extremity 21. It is then withdrawn, and the front fork can then be separated from the steering head. Before or after removal of the rod 12, the knob 44 is unscrewed, to the extent which permits the screwed rod 45 to hinge downwards and so escape from the forks 42 and 43. The two arms of the handlebars may then pivot in the cheeks 9, 10, to take up the position indicated in the chain lines in FIG. 5.

For reassembling, the operations are carried out in the reverse order. When the front fork has been offered up in such a way that the nut 26 is approximately in line with the lower bore 28 of the sleeve 15, the abutment 20 stops it in that position, effectively preventing the nut 26 passing beyond the bore 28. All trial and error is thus eliminated from reassembly. The rod 12 is then first engaged from the above in the collar 30, then in the sleeve 15, its conical extremity 25 facilitating its passage through the smooth bore 29, and then cooperating, towards the end of the travel of the rod, with the conical enlargement 31 of the bore 28. As has already been stated, the four sections 21, 22, 23 and 24 enter successively, in that order, into engagement with the bores which correspond to them, in such a way as to avoid all obstruction of the rod in the course of its introduction. The operation is further facilitated by the careful choice of diameters and clearances. In fact, the diameter of the bore 28 being slightly larger than that of the shank 22, the connecting rod 12 may, without jamming, take up a slight inclination, also permitted by the fact that, in accordance with what has just been said, the section 23 is not yet engaged in the bore 29. Under these conditions, the threads of the extremity 21 may be rapidly brought into engagement with those of the nut 26. On screwing up the rod 12, its conical chamfer 32 will effect the alignment of the hole 28 with the cavity 27 of the nut 26. After having been fully tightened by screwing, the rod 12 is locked by the grip of the collar 30, by means of the wing bolt 49. This locking constitutes a safety precaution, the rod 12 being thus gripped against rotation even if it has not been fully tightened.

Thanks to the device constructed according to the invention, the separation of the two parts of the autocycle is simple and very rapid, and its reassembly is carried out without any trial and error.

Of course, numerous consrtuctional modifications could be made to the different elements of the device described and shown, without in that way going outside the scope of the invention.

I claim:

1. In a demountable cycle having separable front and rear parts; the front part of the cycle comprising a fork constituted by two lower arms adapted to support a front wheel and two uprights upwardly extending from said arms, two vertically spaced cross members interconnecting said uprights, and handlebars mounted upon said fork; and the rear part of said cycle comprising a frame adapted to support a rear wheel and including a tubular steering head adapted to be inserted between said members; the improvement consisting in the provision of a tubular pivoting sleeve inserted in and coaxial with said sleeve, a pair of bearings rotatively supporting the opposite ends of said sleeve upon said head, said head, said sleeve and said bearings forming a pre-set sub-assembly upon said frame, a connecting rod axially insertable through said sleeve via bores in said members, and releasable locking means for connecting said sleeve to and disconnecting it from said members.

2. A cycle according to claim 1, in which said bearings are comprised of a first cup extending outwardly from the lower end of said head, a second cup extending outwardly from the upper end of said head, a first cone fast on the lower end of said sleeve, a second cone removable and adjustably mounted upon the upper end of said sleeve, and sets of bearing balls retained between the cooperating lower and upper pairs of said cups and cones.

3. A cycle according to claim 2, in which the connecting rod includes, from the bottom to the top, four successive portions of increasing diameter, said sleeve and said bores designed to come into contact with said successive portions of said connecting rod.

4. A cycle according to claim 3, in which the four portions of the connecting rod are respectively constituted, in order, by a threaded extremiity screwed into the lower cross member, by a smooth portion engaged at the same time in a recess of the lower cross member and in a lower bore of the sleeve, by a smooth portion engaged in a bore in the upper end of the sleeve, and by a smooth portion engaged in a bore in the upper cross member.

5. A cycle according to claim 4, in which the lower threaded extremity of the connecting rod terminates in a conical tip, and connects to the following smooth portion by another conical shoulder portion, the bore of the lower end of the pivoting sleeve itself having a conical enlargement.

6. A cycle according to claim 5, in which the diameter of the threaded extremity of the connecting rod is slightly less than that of the following smooth portion, and a certain play is maintained between the latter and the corresponding bore of the pivoting sleeve.

7. A cycle according to claim 1, including a forward abutment shapd as an arc of a circle, mounted on the lower cross member, and adapted to engage against the lower end of the steering head, to effect a rough pre-centering of the two parts to be assembled, thus facilitating insertion of the connecting rod.

8. A cycle according to claim 1, in which the upper cross member includes a split collar into which the rod enters, to permit locking of the latter in the assembled position.

9. A cycle according to claim 1, in which the handlebars consist of two arms, each including a vertical portion, each vertical portion being pivoted in the two cross members, whereby the arms of the handlebars can pass from their normal position to a withdrawn position in which they are parallel to one another.

10. A cycle according to claim 9, including two horizontal radial brackets, one mounted on each arm of the handlebars and adapted to abut against the upper cross member when the arms are in running position, and means for locking the brackets to the upper cross member.

References Cited by the Examiner
UNITED STATES PATENTS 3,212,791  10/1965  Edwins _____ 280—279

FOREIGN PATENTS 745,011  2/1956  Great Britain.
83,114  10/1956  Netherlands.
89,095  9/1958  Netherlands.

KENNETH H. BETTS, *Primary Examiner.*